(12) United States Patent
Fujita

(10) Patent No.: US 7,472,329 B2
(45) Date of Patent: Dec. 30, 2008

(54) SHIFT REGISTER, DATA LINE DRIVING CIRCUIT, SCANNING LINE DRIVING CIRCUIT, ELECTRO-OPTICAL DEVICE, AND ELECTRONIC APPARATUS

(75) Inventor: Shin Fujita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 492 days.

(21) Appl. No.: 11/101,502

(22) Filed: Apr. 8, 2005

(65) Prior Publication Data

US 2005/0262413 A1 Nov. 24, 2005

(30) Foreign Application Priority Data

May 24, 2004 (JP) .............................. 2004-153281

(51) Int. Cl.
*G01R 31/28* (2006.01)
*G06F 11/00* (2006.01)

(52) U.S. Cl. ..................... 714/744; 377/71; 377/78; 377/81; 345/98; 345/99; 345/100

(58) Field of Classification Search ................ 714/744; 345/98–100, 204; 377/71, 78, 81
See application file for complete search history.

(56) References Cited

U.S. PATENT DOCUMENTS 4,005,404 A * 1/1977 Soobik ........................ 345/46
4,672,357 A * 6/1987 Lorteije et al. ............. 345/690
5,198,999 A * 3/1993 Abe et al. ............... 365/189.05
6,281,890 B1 * 8/2001 Ito .............................. 345/204
7,023,415 B2 * 4/2006 Fujita et al. ................... 345/98
7,079,617 B2 * 7/2006 Osame et al. ................. 377/81
2003/0231734 A1 12/2003 Fujita et al.
2004/0196272 A1 * 10/2004 Yamashita et al. .......... 345/204
2005/0017964 A1 * 1/2005 Yamazaki et al. ........... 345/204

FOREIGN PATENT DOCUMENTS

| JP | A-63-271298 | 11/1988 |
| JP | A-7-248741 | 9/1995 |
| JP | A-10-74060 | 3/1998 |
| JP | A 2001-034236 | 2/2001 |
| JP | 2001-135093 | * 5/2001 |
| JP | A 2001-324951 | 11/2001 |
| JP | A 2003-308049 | 10/2003 |

* cited by examiner

*Primary Examiner*—Guy J Lamarre
(74) *Attorney, Agent, or Firm*—Oliff & Berridge, PLC

(57) ABSTRACT

To reduce a circuit area of a data line driving circuit. The data line driving circuit includes a plurality of circuit blocks. A circuit block has shift register unit circuits, logical operation unit circuits and a control unit circuit. The control unit circuit specifies the operation period of the corresponding circuit block on the basis of the input and output signals of the shift register unit circuits and supplies a clock signal and an inverted clock signal to the shift register unit circuit.

15 Claims, 16 Drawing Sheets

SHIFT REGISTER, DATA LINE DRIVING CIRCUIT, SCANNING LINE DRIVING CIRCUIT, ELECTRO-OPTICAL DEVICE, AND ELECTRONIC APPARATUS

BACKGROUND

The present invention relates to a shift register, a data line driving circuit, a scanning line driving circuit, an electro-optical device, and an electronic apparatus.

A conventional electro-optical device, for example, a driving circuit of a liquid crystal device is composed of a data line driving circuit or a scanning line driving circuit for supplying a data line signal or a scanning signal to data lines or scanning lines arranged in an image display region at a predetermined timing.

The basic structures of the data line driving circuits are different to each other, depending on whether the input image signal is an analog signal or a digital signal. However, the data line driving circuit comprises a shift register for shifting a transfer signal which is initially supplied in a horizontal scan period in accordance with a clock signal in sequence.

As the shift register, Patent Document 1 discloses the structure having shift means and clock signal control means. The shift means has a plurality of cascade-connected shift unit circuits for shifting a start pulse in synchronization with a clock signal in order to output an output signal and for controlling the transfer direction of the start pulse based on a transfer direction signal indicating a transfer direction. The clock signal control means has a plurality of control unit circuits which are provided to correspond to the shift unit circuits to control the supply of the clock signal to each shift unit circuit.

In other words, in the conventional shift register, the shift unit circuits one-to-one correspond to the control unit circuits.

[Patent Document 1] Japanese Unexamined Patent Application Publication No. 2003-308049 (claim 1).

SUMMARY

However, in the conventional shift register, since the control unit circuits are provided to correspond to shift unit circuits, there is a problem in that a large area is required in order to provide the clock signal control means. Particularly, in the case of applying the shift register to a display having the high definition and high density, there is a problem in that the area of the circuit increases.

Accordingly, the present invention is designed to solve the above-mentioned problems, and it is an object of the present invention to reduce the area of a circuit used in controlling a clock signal.

In order to solve the above-described problems, a shift register according to the present invention comprises a plurality of blocks, wherein each of the plurality of blocks includes a plurality of shift unit circuits for shifting a start pulse in sequence in synchronization with a clock signal and an inverted clock signal thereof and outputting an output signal; and a unit control circuit for specifying the operation period for which any one of the plurality of shift unit circuits is operated and for supplying the clock signal and the inverted clock signal to the plurality of shift unit circuits in the operation period, on the basis of the input signals and the output signals of the plurality of shift unit circuits.

According to the present invention, since whether the clock signal and the inverted clock signal are supplied to the plurality of shift unit circuit belonging to the block by a block unit is controlled, the structure of the unit control circuit can be much reduced as compared to the case that whether the clock signal is supplied or not for each shift unit circuit is controlled. Further, since the clock signal and the inverted clock signal are supplied to any one of the blocks only in the operation period, the power consumption can be reduced. Also, the shift register may generate the inverted clock signal from the supplied clock signal therein.

Moreover, it is preferable that the unit control circuit have level fixing means for supplying a low level signal or a high level signal to the plurality of shift unit circuits instead of the clock signal and the inverted clock signal, in a non-operation period other than the operation period. In this case, since the fixed voltage is supplied to the control input of the shift unit circuit in the non-operation period, the corresponding control input becomes the high impedance state and thus the malfunction due to the noise can be prevented. Further, in the case in which the wiring lines for supplying the clock signal and the inverted clock signal are included and whether the clock signal is selected or the fixed voltage is selected through the transfer gate is switched, the block can be separated from the wiring lines in the non-operation period, and thus the capacitance depending on the wiring can be reduced. As a result, as a driver for the clock signal or the like, a driver having low capability can be used, and thus the power consumption can be reduced.

Also, it is preferable that the unit control circuit have clock control signal generating means for performing the logical sum operation of the periods for which the input signals and the output signals of the plurality of shift unit circuits become an active state and for generating a clock control signal for specifying the operation period based on the operation result, and supply means for supplying the clock signal and the inverted clock signal to the plurality of shift unit circuits according to the clock control signal. In this case, since the clock control signal generating means performs the logical sum operation of the input signals and the output signals of the shift register unit circuits, the period for which the shift unit circuit belonging to the block is operated can be specified.

In addition, it is preferable that in the case in which the start pulse becomes active at the high level, the clock control signal generating means has a plurality of NOR circuits and a NAND circuit for performing the inverted logical product operation of the output signals output from the plurality of NOR circuits and outputting it as the clock control signal, and the input terminals of the plurality of NOR circuits are supplied with all the input signals and the output signals of the plurality of shift unit circuits, respectively. Specifically, it is preferable that each of the plurality of NOR circuits have three input terminals, and the NAND circuit have two input terminals which are supplied with the output signals of the NOR circuits adjacent to each other, respectively. Also, each of the plurality of NOR circuits may comprise two input terminals and each of the input terminals may be supplied with the input signal and the output signal of the shift unit circuit, and each input terminal of the NAND circuits may be respectively supplied with the output signals of the plurality of NOR circuits. Thereby, the clock control signal generating means operated by the positive logic can be constructed.

Furthermore, it is preferable that in the case in which the start pulse becomes active at the low level, the clock control signal generating means have a plurality of NAND circuits and a NOR circuit for performing the inverted logical sum operation of the output signals output from the plurality of NAND circuits and outputting it as the clock control signal, and the input terminals of the plurality of NAND circuits are respectively supplied with all the input signals and the output signals of the plurality of shift unit circuits. Specifically, it is preferable that each of the plurality of NAND circuits have three input terminals and the NOR circuit have two input terminals which are respectively supplied with the output signals of the NAND circuits adjacent to each other. Also, each of the plurality of NAND circuits may have two input terminals and each of the input terminals may be supplied with the input signal and the output signal of the shift unit circuit, and each input terminal of the NOR circuits may be respectively supplied with the output signals of the plurality of NAND circuits. Thereby, the clock control signal generating means operated by the positive logic can be constructed.

Next, the number of the shift unit circuits included in at least one circuit block out of the plurality of circuit blocks may be different from the number of the shift unit circuits included in another circuit block. In this case, since the total number of the shift register circuits belonging to the block is not constant, the stage number of the shift registers can be freely set. Further, at least one shift unit circuit supplied with the clock signal and the inverted clock signal may be provided at the front stage of the input of the plurality of circuit blocks or the rear stage of the output of the plurality of circuit blocks. In this case, even in the case in which a desired stage number is not divided by the number of the shift unit circuits included in the block, the number of the shift unit circuits for always supplying the clock signal and the inverted clock signal is adjusted and thus the stage number of the shift registers can be freely set.

Next, it is preferable that the shift unit circuit can control the transfer direction of the start pulse based on a transfer direction signal indicating a transfer direction. In this case, the shift register can be operated in both directions.

Next, a data line driving circuit according to the present invention is used in an electro-optical device comprising a plurality of scanning lines, a plurality of data lines and a plurality of pixel circuits provided corresponding to intersections of the scanning lines and the data lines and the data line driving circuit comprises the above-described shift register; a plurality of logical operation circuits for generating data line signals, based on the input signals and the output signals of the shift unit circuits; and a wiring line group for supplying a plurality of data line signals output from the plurality of logical operation circuits to the plurality of data lines, respectively. According to the present invention, since the unit control circuit can use the remarkably simplified shift register, the structure of the data line driving circuit can be simplified and the circuit area can be remarkably reduced. As a result, the data line driving circuit can be easily formed on the panel having the high definition and the high density. Further, the number of the elements can be remarkably reduced and thus the yield can be improved.

Next, a scanning line driving circuit according to the present invention is used in an electro-optical device comprising a plurality of scanning lines, a plurality of data lines and a plurality of pixel circuits provided corresponding to intersections of the scanning lines and the data lines, and the data line driving circuit comprises the above-described shift registers; a plurality of logical operation circuits for generating scanning signals, based on the input signals and the output signals of the shift unit circuits; and a wiring line group for supplying a plurality of the scanning signals output from the plurality of logical operation circuits to the plurality of scanning lines, respectively. According to the present invention, since the unit control circuit can use the remarkably simplified shift register, the structure of the scanning line driving circuit can be simplified and the circuit area can be remark-
ably reduced. As a result, the data line driving circuit can be easily formed on the panel having the high definition and the high density. Further, the number of the elements can be remarkably reduced and thus the yield can be improved.

An electro-optical device according to the present invention comprises a plurality of scanning lines; a plurality of data lines; a plurality of pixel circuits provided corresponding to intersections of the scanning lines and the data lines; and the above-described data line driving circuit. The electro-optical device according to the present invention comprises a plurality of scanning lines; a plurality of data lines; a plurality of pixel circuits provided corresponding to intersections of the scanning lines and the data lines; and the above-described scanning line driving circuit. Here, the electro-optical device is the device having the electro-optical material, and the electro-optical material is the material of which the optical characteristic such as transmittance or brightness is varied by the supply of the electrical signal (the current signal or the voltage signal). For example, in addition to the liquid crystal, an OLED element such as the organic EL (electroluminescent) or light-emitting polymer can be included.

Next, it is preferable that an electronic apparatus according to the present invention have the above-described electro-optical device. As the electronic apparatus, for example, a personal computer, a cellular phone and a personal digital assistant are included.

DETAILED DESCRIPTION OF EMBODIMENTS

<1-1: Entire Structure of Electro-optical Device>

First, an electro-optical device according to the present invention uses liquid crystal serving as electro-optical material. The electro-optical device 1 comprises a liquid crystal panel AA serving as a main portion. The liquid crystal panel AA is formed by facing and attaching an element substrate which has a thin film transistor (thin film transistor: hereinafter, referred to as a TFT) thereon as a switching element and a counter substrate to each other so that the electrode forming surfaces thereof face each other at a constant gap and by inserting the liquid crystal in the gap.

Figure 1:
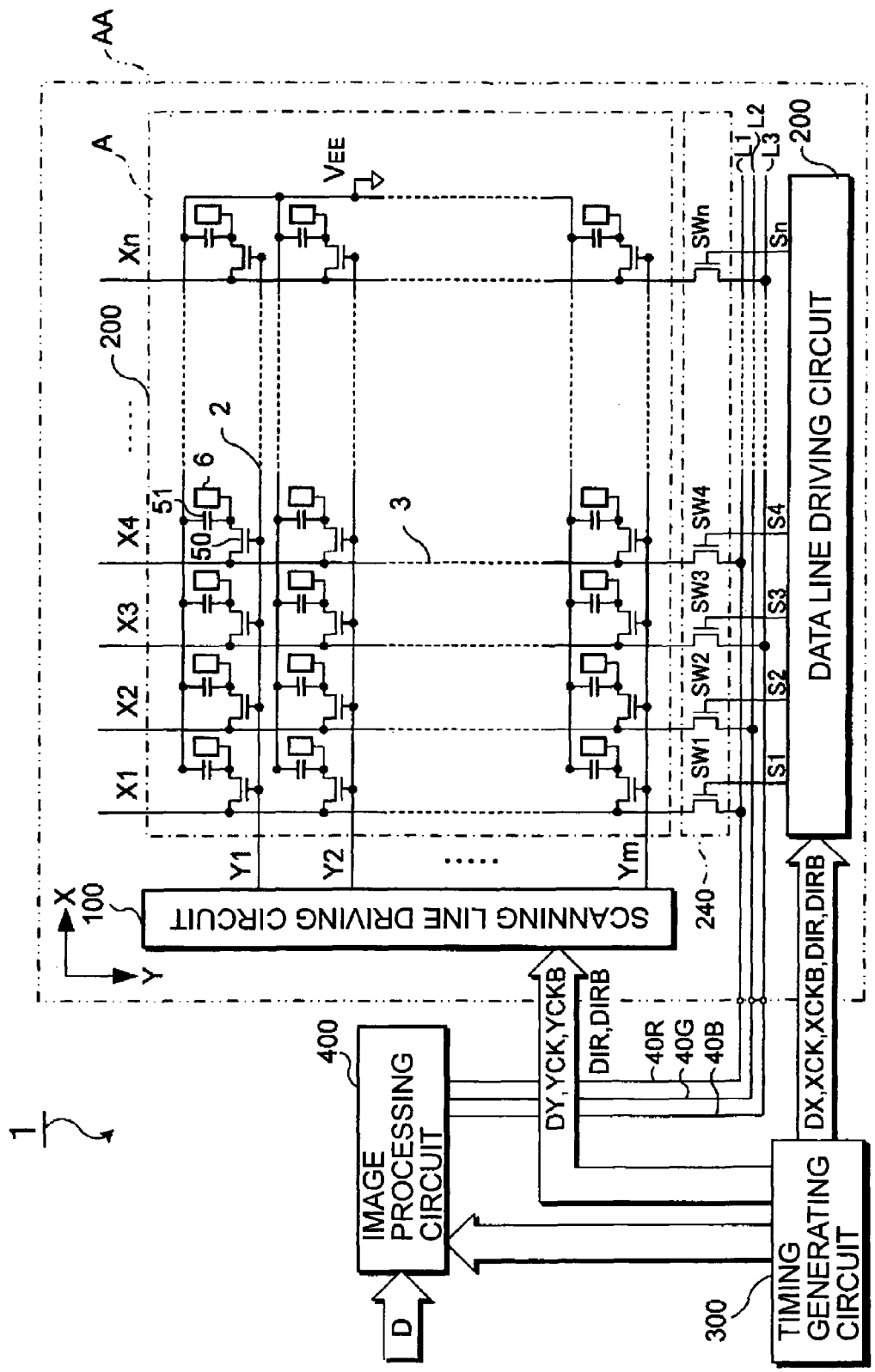
FIG. 1 is a block diagram showing the entire structure of an electro-optical device 1 according to the present invention.

FIG. 1 is a block diagram showing the entire structure of the electro-optical device 1 according to the present embodiment. The electro-optical device 1 comprises a liquid crystal panel AA, a timing generating circuit 300 and an image processing circuit 400. The liquid crystal panel AA includes an image display region A, a scanning line driving circuit 100, a data line driving circuit 200, a sampling circuit 240 and image signal supplying lines L1 to L3, which are formed on the element substrate.

The input image data D supplied to the electro-optical device 1 is of 3-bit parallel form, for example. The timing generating circuit 300 generates a Y clock signal YCK, an inverted Y clock signal YCKB, a X clock signal XCK, an inverted X clock signal XCKB, a Y transfer start pulse DY, a X transfer start pulse DX, a transfer direction control signal DIR and an inverted transfer direction control signal DIRB in synchronization with the input image data D and outputs them to the scanning line driving circuit 100 and the data line driving circuit 200. Further, the timing generating circuit 300 generates various kinds of timing signals for controlling the image processing circuit 400 to output them.

Here, the Y clock signal YCK specifies the period for selecting the scanning line 2 and the inverted Y clock signal YCKB is the signal inverted from the logic level of the Y clock signal YCK. The X clock signal XCK specifies the period for selecting the data line 3 and the inverted X clock signal XCKB is the signal inverted from the logic level of the X clock signal XCK. Also, the Y transfer start pulse DY is the pulse indicating the selection start of the scanning line 2 and the X transfer start pulse DX is the pulse indicating the selection start of the data line 3. Further, the transfer direction control signal DIR is the signal indicating the selection sequences of the scanning line 2 and the data line 3. When the logic level thereof is high level, the transfer direction control signal DIR instructs sequential selecting each scanning line 2 from the upper side to the lower side and sequential selecting each data line 3 from the left side to the right side. On the other hand, when the logic level thereof is low level, the transfer direction control signal DIR instructs sequential selecting each scanning line 2 from the lower side to the upper side and the sequential selecting each data line 3 from the right side to the left side.

Although the common transfer direction control signal DIR and the inverted transfer direction control signal DIRB are commonly supplied to the scanning line driving circuit 100 and the data line driving circuit 200 in this example, the signal for selecting the scanning line and the signal for selecting the data line may be separately generated in the timing generating circuit 300 to be supplied to the scanning line driving circuit 100 and the data line driving circuit 200.

In the image processing circuit 400, the input image data D is gamma-corrected in consideration of the light transmitting characteristic of the liquid crystal panel and then each of the image data RGB is D/A converted to generate the image signals 40R, 40G, and 40B to supply them to the liquid crystal panel AA.

<1-2: Image Display Region>

Next, on the image display region A, as shown in FIG. 1, m (m is an integer which is more than and equal to 2) scanning lines 2 are arranged in parallel along the X direction, and n (n is an integer which is more than and equal to 2) data lines 3 are arranged in parallel along the Y direction. In addition, at the vicinity of the intersection of the scanning line 2 and the data line 3, the gate of a TFT 50 is connected to the scanning line 2, the source of the TFT 50 is connected to the data line 3, and the drain of the TFT 50 is connected to the pixel electrode 6. Further, each pixel is composed of a pixel electrode 6, a counter electrode (as described below) formed on the counter substrate, and liquid crystal interposed between the both electrodes. At the result, the pixels are arranged in a matrix so as to correspond to the intersections of the scanning lines 2 and the data lines 3.

Further, each scanning line 2 to which the gate of the TFT 50 is connected is applied with the scanning signals Y1, Y2, . . . , and Ym in a pulse form and in line sequence. Thereby, if any scanning line 2 is supplied with the scanning signal, the TFT 50 connected to the corresponding scanning line is turned on, and thus the image signals X1, X2, . . . , and Xn supplied from the data line 3 at a predetermined timing are sequentially written into the corresponding pixels and then are held during a predetermined period.

Since the orientation or the order of the liquid crystal molecules is varied in accordance with the level of the voltage applied to each pixel, the gray scale display according to the optical modulation can be performed. For example, the light amount passing through the liquid crystal is restricted as the applied voltage increases if it is a normally-white mode, but is relaxed as the applied voltage increases if it is a normally-black mode. Accordingly, in the entire electro-optical device 1, the light having the contrast corresponding to the image signal is emitted for each pixel. Thereby, the desired display can be achieved.

Also, in order to prevent the held image signal from leaking, a storage capacitor 51 is provided parallel to a liquid crystal capacitor formed between the pixel electrode 6 and the counter electrode. For example, the voltage of the pixel electrode 6 is held by the storage capacitor 51 for the period which is longer than the period for applying the source voltage by three ciphers, the hold characteristic is improved and thus the high contrast ratio can be accomplished.

<1-3: Data Line Driving Circuit and Sampling Circuit>

Next, the data line driving circuit 200 generates sampling signals S1 to Sn which are an active state sequentially in synchronization with the X clock signal XCK. Further, the data line driving circuit 200 can control the sequence that the sampling signals S1 to Sn are in an active state by the transfer direction control signal DIR and the inverted transfer direction control signal DIRB. Specifically, in the case in which the transfer direction control signal DIR is a high level and the inverted transfer direction control signal DIRB is a low level, the sampling signals become active in the sequence of S1→S2→, . . . , and Sn, and, in the case in which the transfer direction control signal DIR is a low level and the inverted transfer direction control signal DIRB is a high level, the sampling signals become active in the sequence of Sn→Sn-1→, ..., and S1.

The sampling circuit 240 has n switches SW1 to SWn. Each of the switches SW1 to SWn is composed of the TFT. Also, if the sampling signals S1 to Sn supplied to the gates become active in sequence, the switches SW1 to SWn are turned on in sequence. Then, the image signals 40R, 40G, and 40B supplied through the image signal supplying lines L1 to L3 are sampled and are supplied to the data lines 3 in sequence. Accordingly, if the sampling signals become active in the order of S1→S2→, ..., and Sn, the data lines 3 are selected from the left side to the right side in sequence, and, if the sampling signals become active in the order of Sn→Sn-1→, ..., and S1, the data line 3 are selected from the right side to the left side in sequence. Further, the sampling circuit 240 may be included in the data line driving circuit 200.

Figure 2:
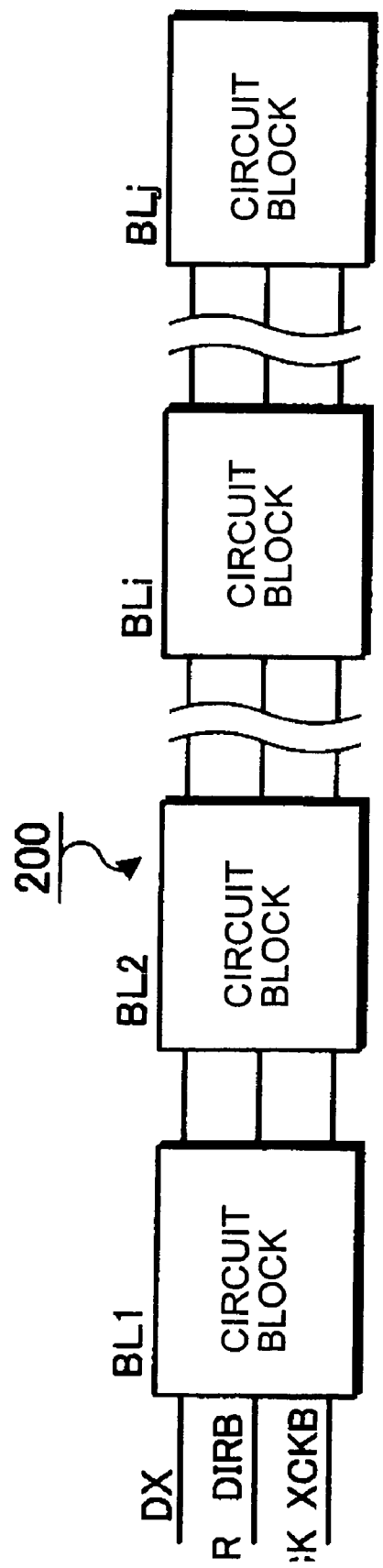
FIG. 2 is a block diagram showing the structure of a data line driving circuit 200 in the electro-optical device.

Next, FIG. 2 is a circuit diagram showing the detailed structure of the data line driving circuit 200. As shown in FIG. 2, the data line driving circuit 200 includes j (j is an integer) circuit blocks BL1, BL2, ..., and BLj.

Figure 3:
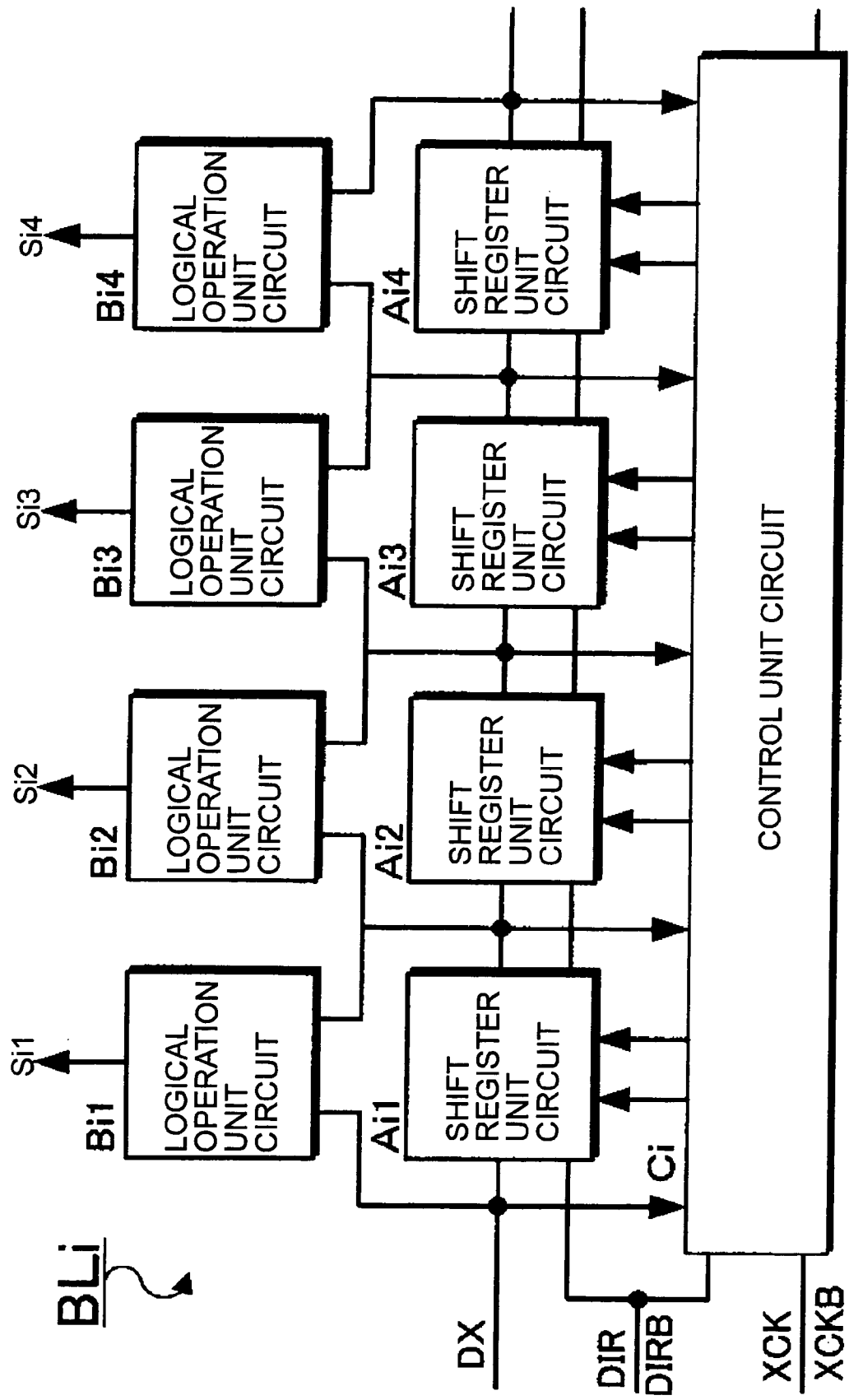
FIG. 3 is a block diagram of a circuit block BLi in the data line driving circuit.

In FIG. 3, the structure of the i-th (1≦i≦j) circuit block BLi is shown. As shown in FIG. 3, this circuit block BLi includes four shift register unit circuits Ai1, Ai2, ..., and Ai4 and transfers the X transfer start pulse DX. Also, the shift register unit circuits Ai1 to Ai4 are supplied with the transfer direction control signal DIR and the inverted transfer direction control signal DIRB and thus the transfer direction is controlled.

The control unit circuit Ci specifies the operation periods of the shift register unit circuits Ai1 to Ai4, on the basis of the input signals and the output signals of the shift register unit circuits Ai1 to Ai4. Further, in this period, the X clock signal XCK and the inverted X clock signal XCKB are supplied from the control unit circuit Ci to the shift register unit circuits Ai1 to Ai4. As such, since the control unit circuit Ci controls the plurality of shift register unit circuits Ai1 to Ai4 collectively, the number of the control unit circuits in the data line driving circuit 200 can be drastically reduced.

Figure 4:
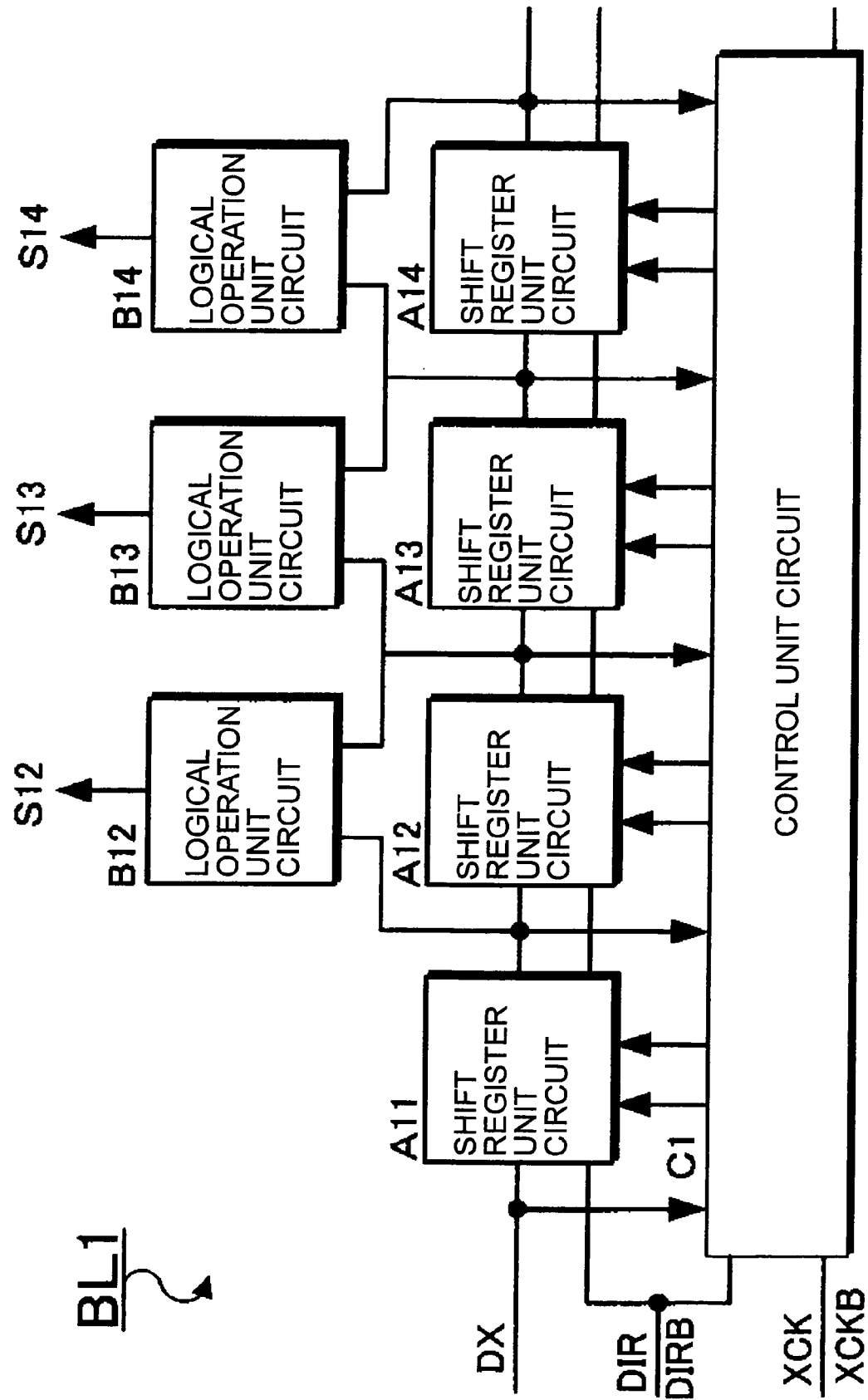
FIG. 4 is a block diagram of a circuit block BL1 in the data line driving circuit.
Figure 5:
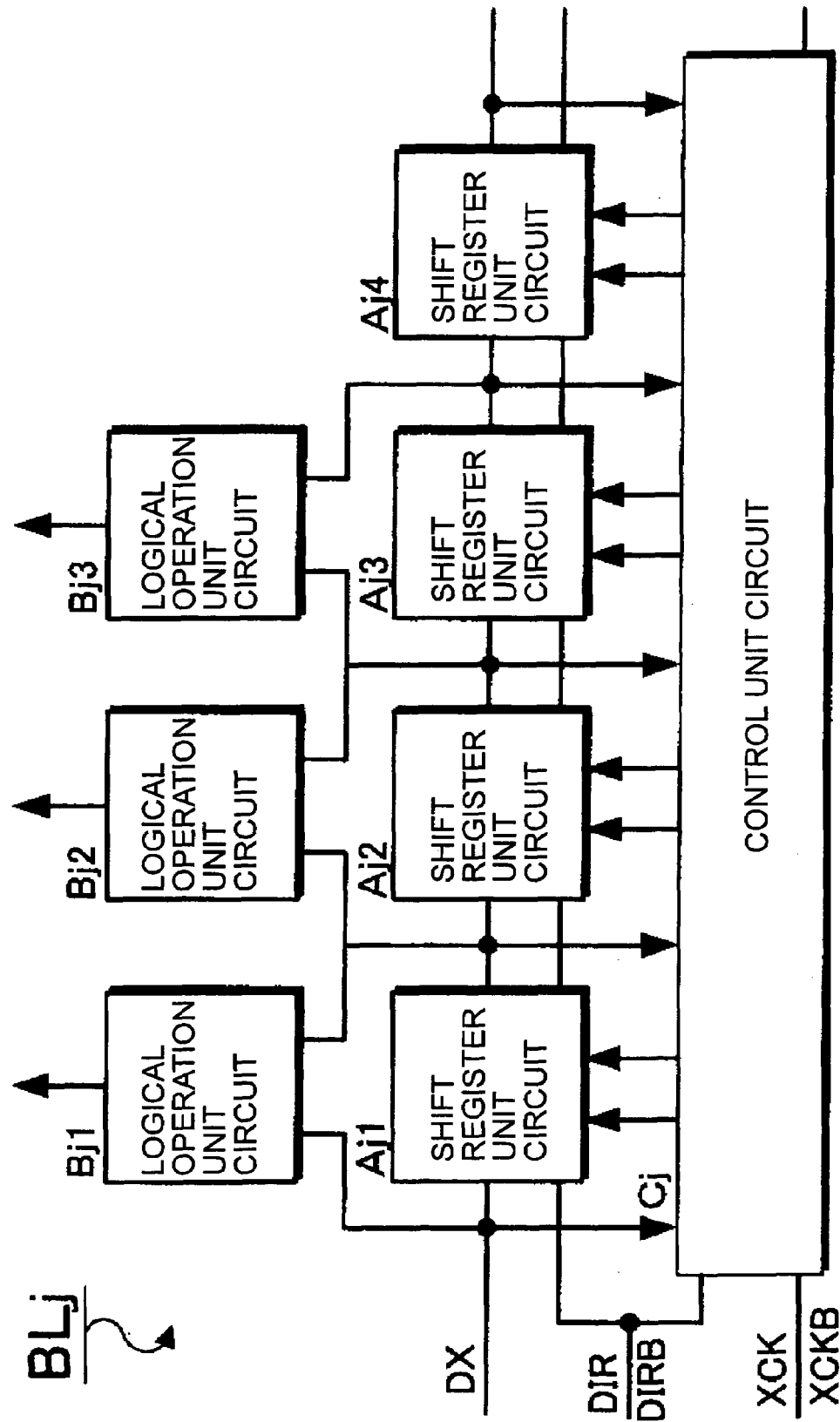
FIG. 5 is a block diagram of a circuit block BLj in the data line driving circuit.

Logical operation unit circuits Bi1, Bi2, ..., and Bi4 are provided to correspond to the plurality of shift register unit circuits Ai1, Ai2, ..., and Ai4 and generates the sampling signals Si1, Si2, ..., and Si4. The circuit blocks BL2 to BLi-1 are constructed similarly to the above-described circuit block BLi. However, as shown in FIG. 4, the circuit block BL1 located at the left end does not have the logical operation circuit corresponding to the shift register unit circuit A11, and as shown in FIG. 5, the circuit block BLj located at the right end does not have the logical operation circuit corresponding to the shift register unit circuit Ai4.

Figure 6:
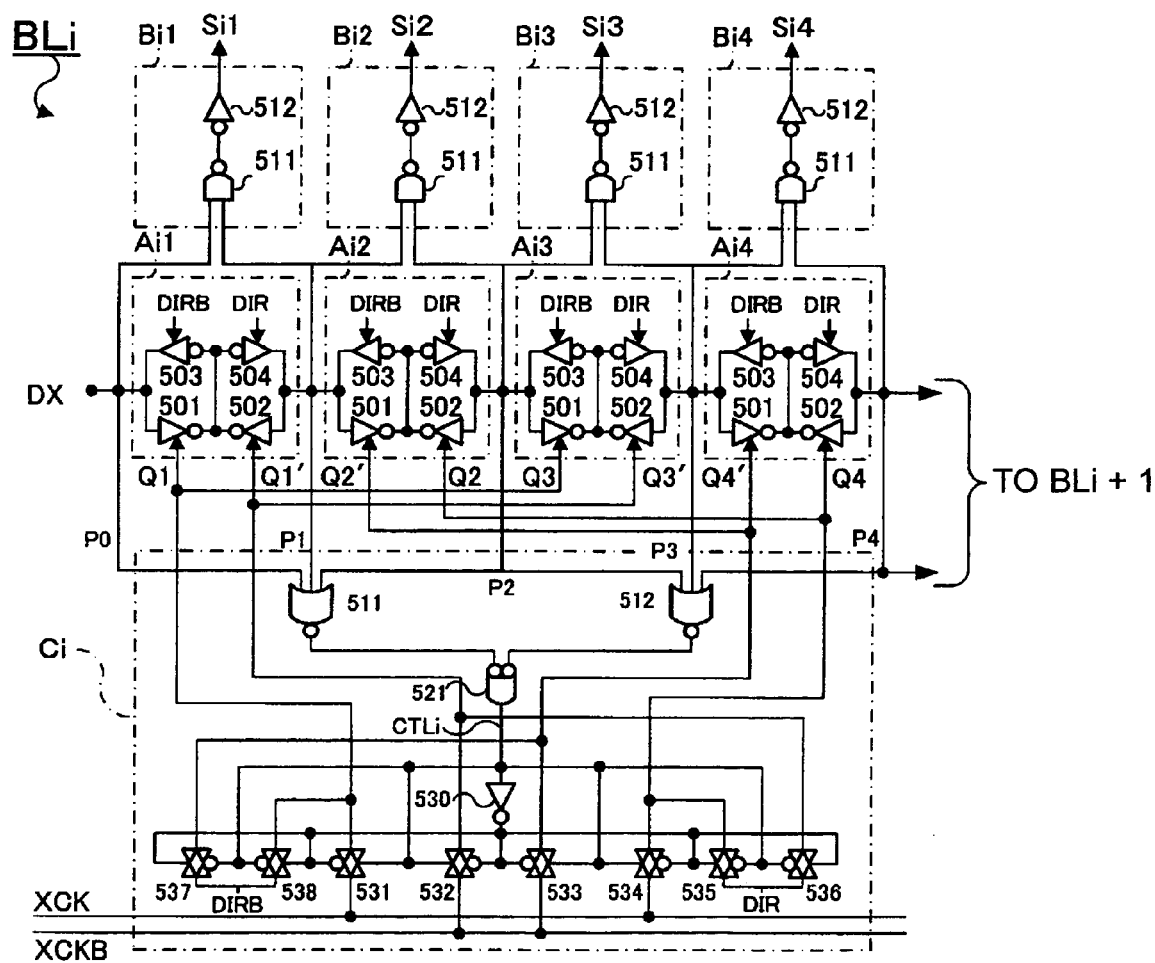
FIG. 6 is a circuit diagram of the circuit block BLj.

FIG. 6 is a detailed circuit diagram of the circuit block BLi. Each of the logical operation unit circuits Bi1 to Bi4 has a NAND circuit 511 and an inverter 512. The NAND circuit 511 of the logical operation unit circuit Bik (k is 1, 2, 3 or 4) is supplied with the input signal and the output signal of the shift register unit circuit Aik.

Each of the shift register unit circuits Ai1 to Ai4 has clocked inverters 501 to 504. Each of the clocked inverters 501 to 504 inverts the input signal to output the inverted signal when the control terminal voltage is a high level and allows the output terminal to become a high impedance state when the control terminal voltage is the low level. Each of the control terminals of the clocked inverters 501 and 502 is supplied with the X clock signal XCK and the inverted X clock signal XCKB which become the active for a predetermined period. Also, the control terminal of the clocked inverter 503 is supplied with the inverted transfer direction control signal DIRB and the control terminal of the clocked inverter 504 is supplied with the transfer direction control signal DIR.

Assuming that the transfer direction control signal DIR is the high level and the inverted transfer direction control signal DIRB is the low level, the clocked inverter 503 becomes the high impedance state and the clocked inverter 504 functions as the inverter. Accordingly, in the case in which the transfer direction control signal DIR is a high level, the shift register unit circuits Ai1 to Ai4 are equivalent to the circuit shown in FIG. 7(A).

On the contrary, assuming that the transfer direction control signal DIR is the low level and the inverted transfer direction control signal DIRB is the high level, the clocked inverter 504 becomes the high impedance state and the clocked inverter 503 functions as the inverter. Accordingly, in the case in which the transfer direction control signal DIR is a low level, the shift register unit circuits Ai1 to Ai4 are equivalent to the circuit shown in FIG. 7(B).

Figure 7A:
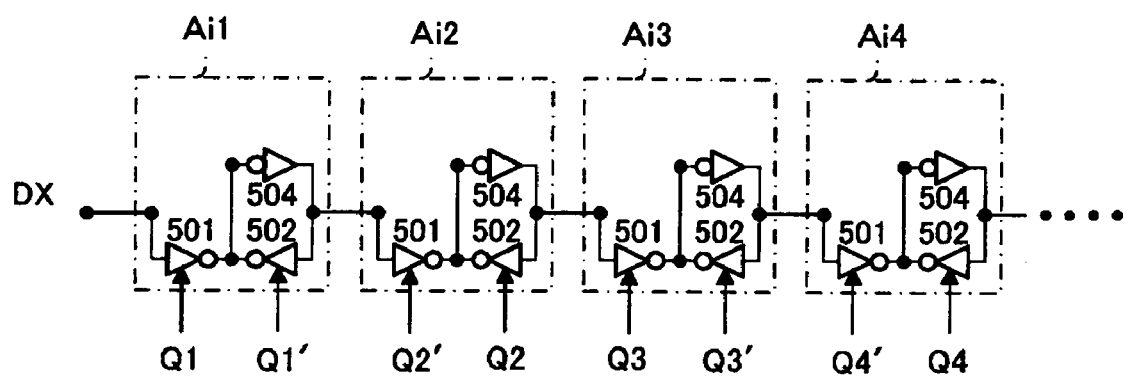
FIG. 7(A) is an equivalent circuit diagram of the shift register unit circuits Ai1 to Ai4 in the case in which that a transfer direction control signal DIR is the high level.
Figure 7B:
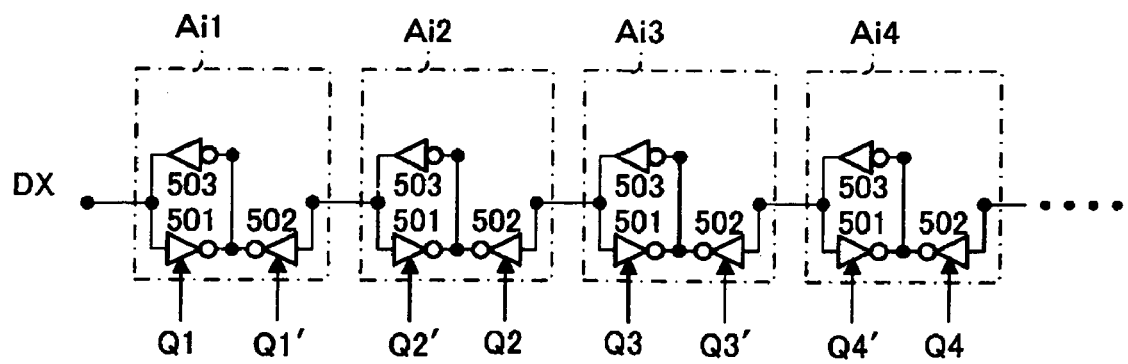
FIG. 7(B) is an equivalent circuit diagram of the shift register unit circuits Ai1 to Ai4 in the case in which the transfer direction control signal DIR is the low level.

Here, suppose that the logic level of the transfer direction control signal DIR is the high level (see FIG. 7(A). The clocked inverters 501 in the shift register unit circuits Ai1 to Ai4 are supplied with the first control signals Q1, Q2', Q3, and Q4', respectively, and the clocked inverters 502 are supplied with the second control signals Q1', Q2, Q3', and Q4, respectively. The logic level of the second control signal is inverted from the logic level of the first control signal.

In the shift register unit circuit Ai1, the clocked inverter 501 inverts and outputs the X transfer start pulse DX when the first control signal Q1 is the high level. At this time, since the second control signal Q1' becomes the low level, the output terminal of the clocked inverter 502 becomes the high impedance state. In this case, the X transfer start pulse DX is output through the clocked inverter 501 and the inverter 503. On the other hand, the clocked inverter 502 inverts and outputs the X transfer start pulse DX when the second control signal Q1' is the high level. At this time, since the first control signal Q1 is the low level, the output terminal of the clocked inverter 501 becomes the high impedance state. In this case, the clocked inverter 502 and the inverter 504 constitute a latch circuit.

In other words, each of the shift register unit circuits Ai1 to Ai4 includes a first logical circuit composed of the clocked inverters 501 and 503 and a second logical circuit composed of the clocked inverters 502 and 504. Further, in the case in which the transfer direction control signal DIR is the high level (the transfer direction is from the left side to the right side), the first logical circuit functions as the clocked inverter 501 controlled by the first control signal and the second logical circuit functions as the latch circuit. Also, in the case in which the inverted transfer direction control signal DIRB is the high level (the transfer direction is from the right side to the left side), the first logical circuit functions as the latch circuit and the second logical circuit functions as the clocked inverter controlled by the second control signal.

Figure 8:
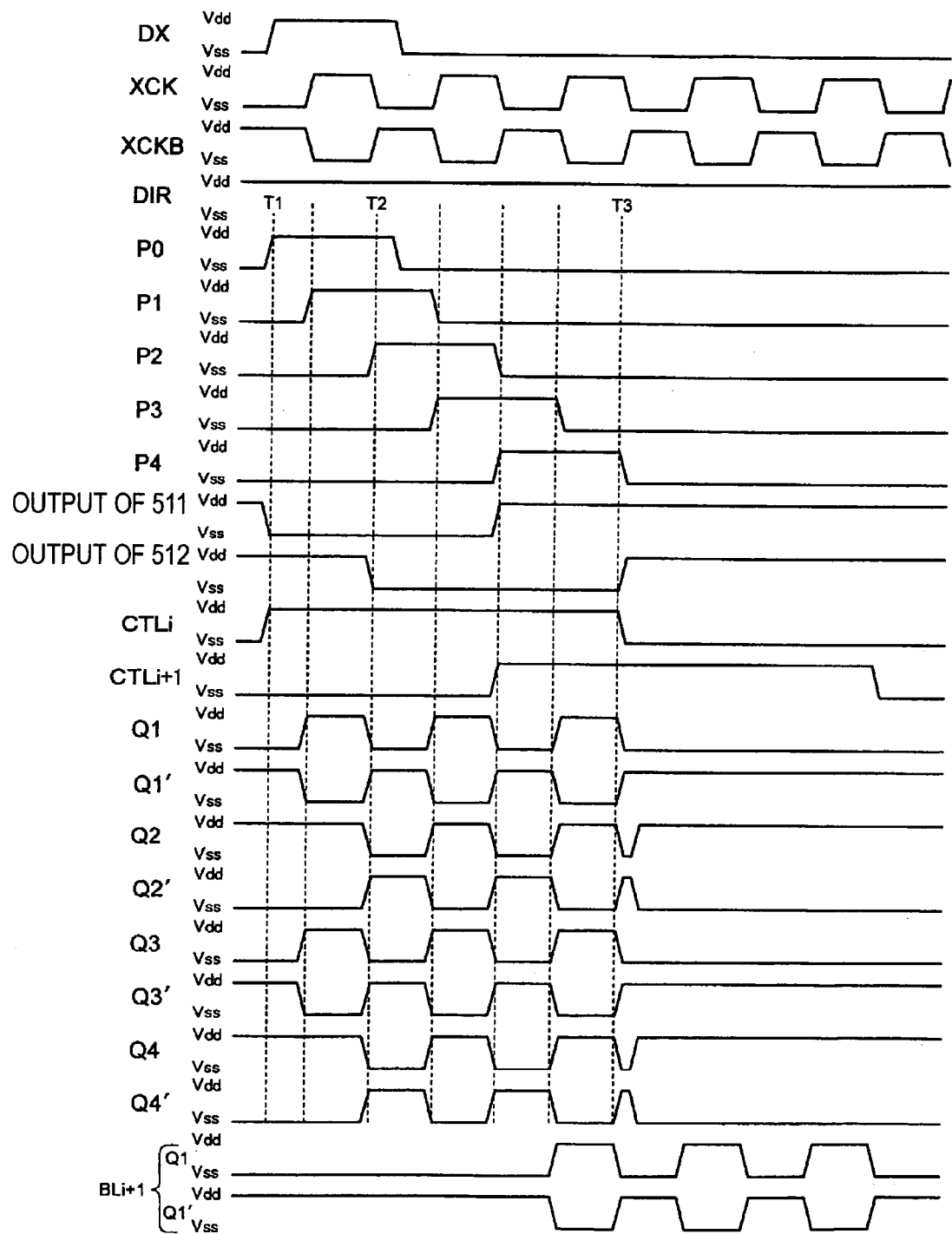
FIG. 8 is a timing chart of the circuit block BLi.

Returning to FIG. 6, the control unit circuit Ci includes NOR circuits 511 and 512, a NAND circuit 521, an inverter 530, and transfer gates 531 to 538. FIG. 8 is a timing chart showing the operation of the data line driving circuit 200. However, suppose that the transfer direction control signal DIR is the high level and the X transfer start pulse DX is transferred from the left side to the right side. Also, suppose that the input signal of the shift register unit circuit Ai1 is P0 (which is equal to the X transfer start pulse DX), the output signal of the shift register unit circuit Ai1 is P1, the output signal of the shift register unit circuit Ai2 is P2, the output signal of the shift register unit circuit Ai3 is P3, and the output signal of the shift register unit circuit Ai4 is P4.

At a timing T1, when the signal P0 becomes the high level, the output signal of the NOR circuit 511 becomes the low level and thus the output signal of the NAND circuit 521 becomes the high level. In the following description, the output signal of the NAND circuit 521 is referred to as a clock control signal CTLi. Also, a subscript "i" attached to "CTL" designates the circuit block and the clock control signal of the circuit block BLi+1 at the next stage becomes CTLi+1. When the clock control signal CTLi becomes active (high level), the transfer gates 531 to 534 are turned on and the X clock signal XCK is supplied to the shift register unit circuits Ai1 to Ai4 as the signals Q1, Q2, Q3 and Q4, respectively. In addition, the inverted X clock signal XCKB is supplied to the shift register unit circuits Ai1 to Ai4 as the signals Q1', Q2', Q3' and Q4', respectively.

Thereby, the X transfer start pulse DX is sequentially transferred in the order of the signal P0→the signal P1→the signal P2→the signal P3→the signal P4. Since the NOR circuit 512 is supplied with the signal P2, the output signal thereof becomes the low level at the timing T2 when the signal P2 becomes the high level. Further, when the signal P4 is transited to the low level at the timing T3, the output signal of the NOR circuit 512 becomes non-active. Since the clock control signal CTLi is generated by the NAND circuit 521, it becomes active in a period for which any one of the output signals of the NOR circuits 511 and 512 becomes the low level. Thereby, the clock control signal CTLi becomes active in the period from the timing T1 to the timing T3.

Further, since the clock control signal CTLi becomes non-active when the timing T3 elapses, the transfer gates 531 to 534 are turned off. On the other hand, in the period for which the clock control signal CTLi is active, the transfer gates 535 to 538 that are in the OFF state are turned on. Thereby, the signals Q1', Q2, Q3' and Q4 become the high level and the signals Q1, Q2', Q3 and Q4' become the low level. Then, in each of the shift register unit circuits Ai1 to Ai4, the clocked inverter 501 becomes the high impedance state, and the inverter 504 and the clocked inverter 502 constitute a latch circuit. As a result, the levels of the output signals of the shift register unit circuits Ai1 to Ai4 hold the low level until the X transfer start pulse DX becomes the high level again. In other words, when the X transfer start pulse DX is input, the circuit block BLi automatically detects the X transfer start pulse DX to initiate the shift operation, and when the operation is completed, the operation is stopped until the next X transfer start pulse DX is input. Thereby, the consumed power can be reduced.

In addition, since the control unit circuit Cj collectively controls the plurality of shift register unit circuits Ai1 to Ai4, the structure can be simplified as compared to the case of providing the control unit circuit Cj in each of the shift register unit circuits.

Figure 9:
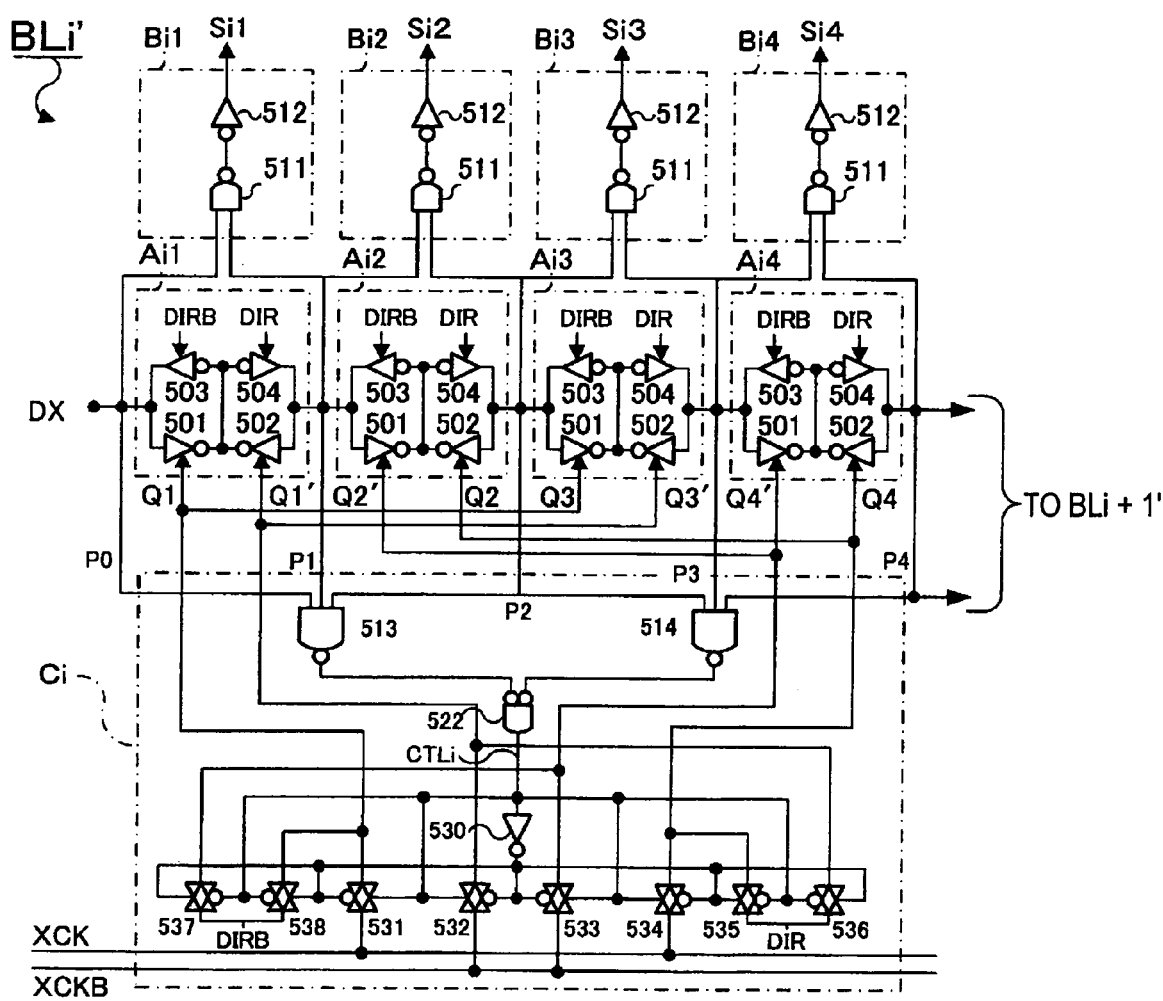
FIG. 9 is a circuit diagram of the circuit block BLi' according to the negative logic.
Figure 10:
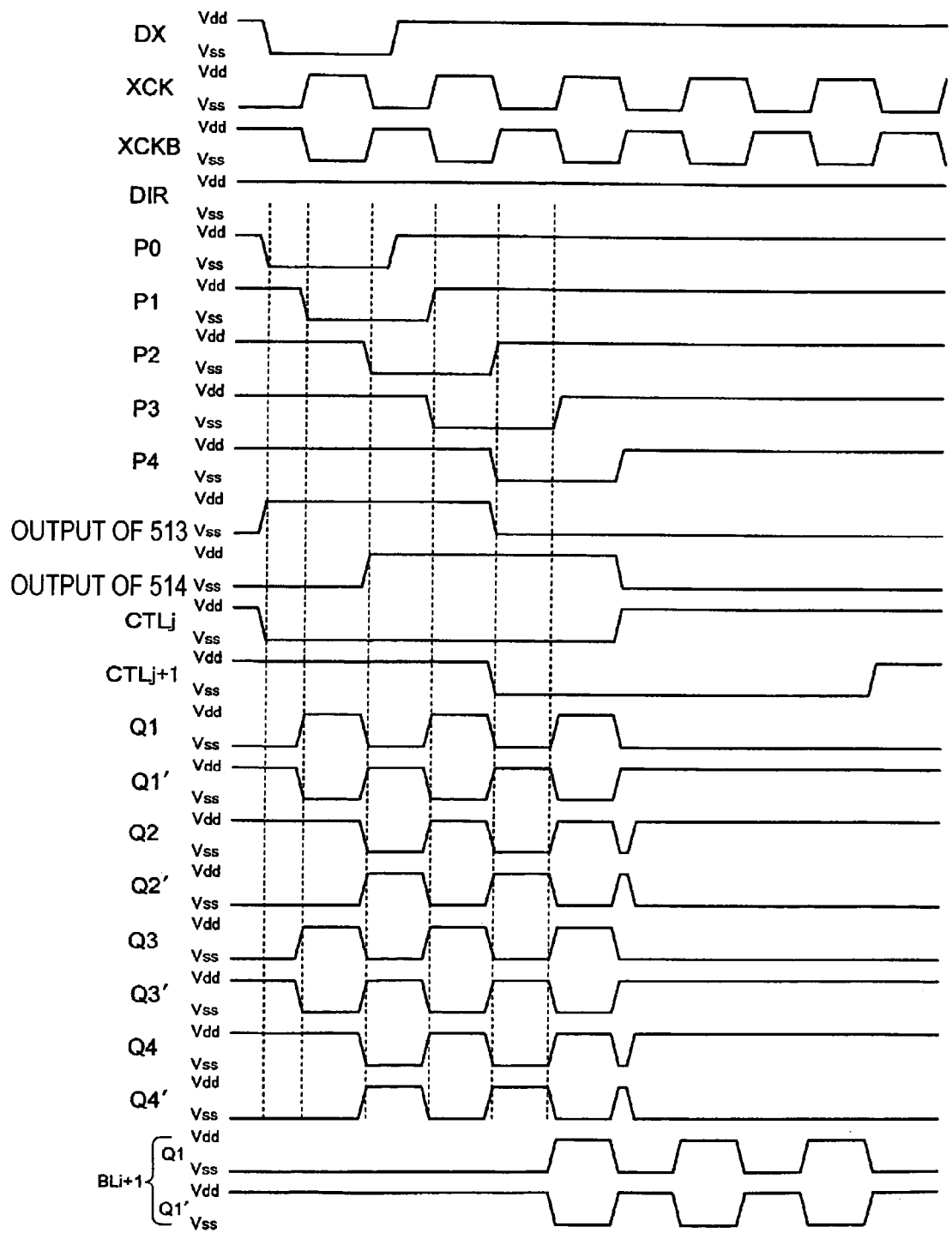
FIG. 10 is a timing chart of the data line driving circuit 200.

In addition, although the above-described circuit block BLi is composed of positive logic, it may be composed of negative logic. FIG. 9 shows the circuit block BLi' composed of the negative logic. In the circuit block BLi' of the negative logic, NAND circuits 513 and 514 are used instead of the NOR circuits 511 and 512 and a NOR circuit 522 is used instead of the NAND circuit 521. The timing chart of the circuit block BLi' is shown in FIG. 10. The clock control signal CTLi' becomes active at the low level. Thereby, the polarities of the control inputs of the transfer gates 531 to 538 are reversed to those in the positive logic shown in FIG. 6.

<1-4: Scanning Line Driving Circuit>

Figure 11:
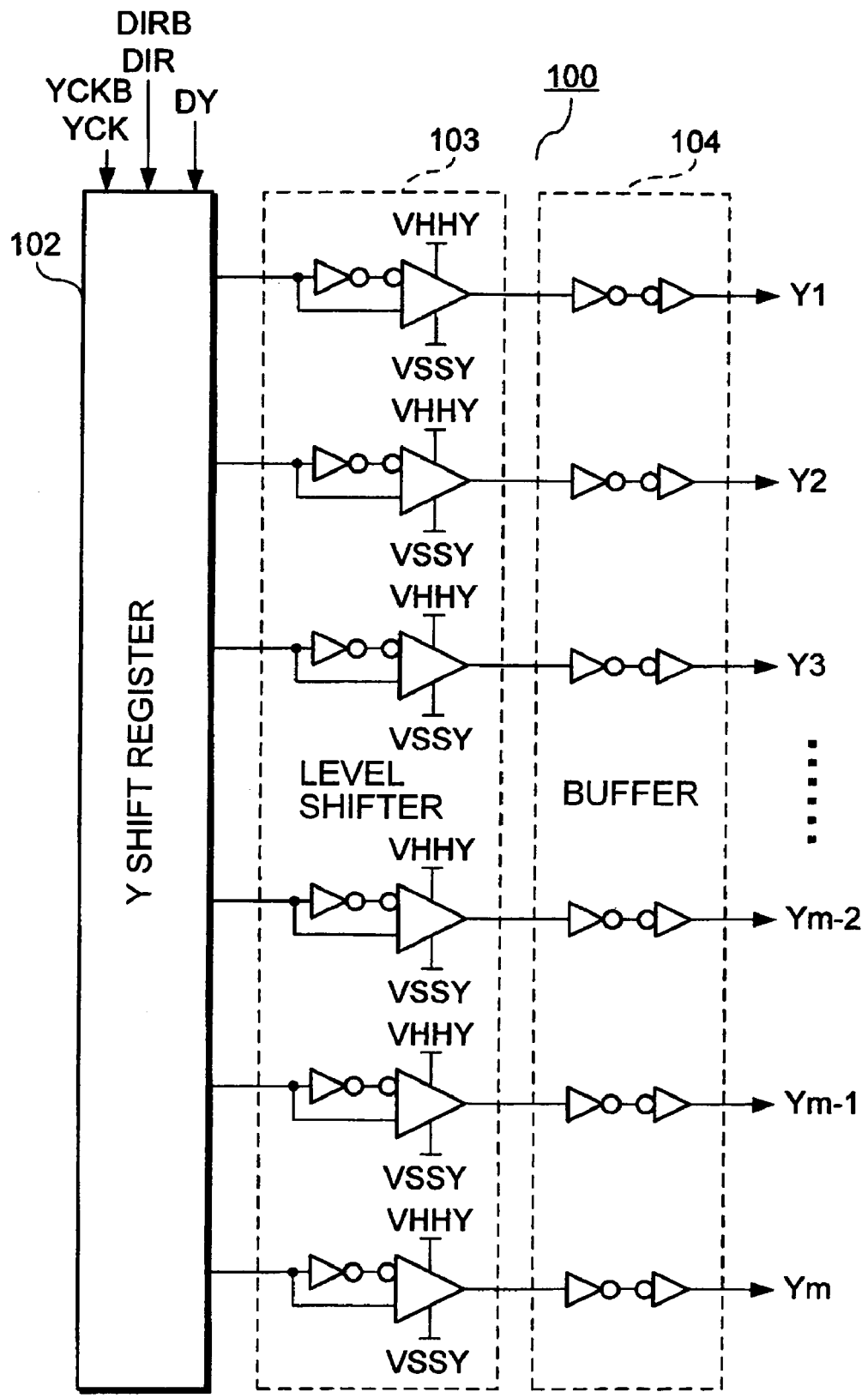
FIG. 11 is a block diagram showing the structure of the scanning line driving circuit 100.

Next, the scanning line driving circuit 100 will be explained. FIG. 11 is a block diagram showing the structure of the scanning line driving circuit 100. As shown in FIG. 11, the scanning line driving circuit 100 includes a Y shift register 102, a level shifter 103 and a buffer 104.

The Y shift register 102 is similar to the above-described data line driving circuit 200, except for that a Y clock signal YCK and an inverted clock signal YCKB are supplied instead of the X clock signal XCK and the inverted X clock signal XCKB and the stage number of the shifters is different. Therefore, the circuit scale of the scanning line driving circuit 100 is reduced, similarly to the above-described data line driving circuit 200.

The level shifter 103 shifts the levels of the output signals of the Y shift register 102 to convert them to the levels suitable for driving the scanning line 2. Also, the buffer 104 converts the output signals of the level shifters 103 to the low impedances and outputs them to the scanning lines 2 as the scanning line driving signals Y1, Y2, . . . , and Ym, respectively.

Also, in the scanning line driving circuit 100, the Y shift register 102 may be composed of the negative logic shown in FIG. 9.

<1-5: Structure of Liquid Crystal Panel>

Figure 12:
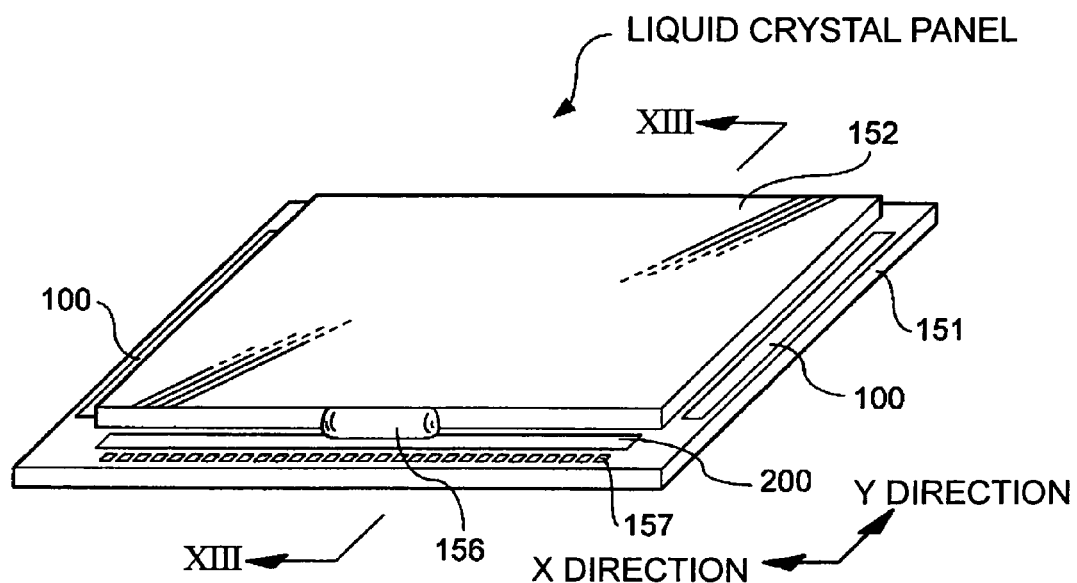
FIG. 12 is a perspective view illustrating the structure of a liquid crystal panel.
Figure 13:
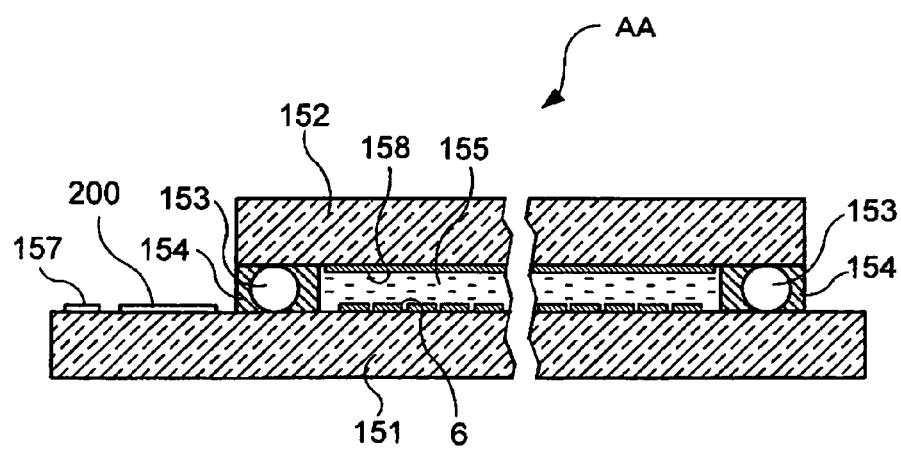
FIG. 13 is a partial cross-sectional view illustrating the structure of the liquid crystal panel.

Next, the entire structure of the liquid crystal panel having the above-described electrical structure will be described with reference to FIGS. 12 and 13. Here, FIG. 12 is a perspective view showing the structure of the liquid crystal panel AA and FIG. 13 is a cross-sectional view taken along the line Z-Z' of FIG. 12.

As shown in Figures, the liquid crystal panel AA has the structure that an element substrate 151 such as glass or semiconductor having pixel electrodes 6 and a transparent counter substrate 152 having a common electrode 158 are held at a constant gap by sealing materials 154 mixed with spacers 153, and are adhered to each other so that the electrode forming surfaces thereof face each other and the liquid crystal 155 functioning as the electro-optical material is sealed in the gap. Also, the sealing material 154 is formed along the periphery of the counter substrate 152, but the portion thereof is opened in order to fill the liquid crystal 155. Thereby, after filling the liquid crystal 155, the opening is sealed by a sealant 156.

Here, in one side of the sealing material 154 at a surface opposite to the element substrate 151, the above-described data line driving circuit 200 is formed to drive the data lines 3 extending in the Y direction. Further, this one side is formed with a plurality of connecting electrodes 157 for inputting the image signals 40R, 40G, 40B or various signals from the timing generating circuit 300. Also, the other side adjacent to the above-described side is formed with the scanning line driving circuit 100 to drive the scanning lines 2 extending in the X direction from the both sides. On the other hand, the common electrode 158 of the counter substrate 152 is electrically connected to the element substrate 151 by the conductive material provided in at least one of four corners at the portions adhered with the element substrate 151. Besides, on the counter substrate 152, in accordance with the usage of the liquid crystal panel AA, color filters arranged in a stripe shape, a mosaic shape, or a triangle shape are firstly provided, and a black matrix such as resin black which a metal material such as chrome or nickel, or carbon or titanium is secondly dispersed in the photoresist is provided, and a backlight for irradiating the light to the liquid crystal panel AA is thirdly provided. Particularly, in the case of the usage of the colored ray modulation, the color filter is not formed and the black matrix is provided on the counter substrate 152.

In addition, the opposite surfaces of the element substrate 151 and the counter substrate 152 are provided with alignment films which are rubbed in predetermined directions, respectively, and, the rear surfaces are provided with polarizing plates (not shown) according to the orientation directions, respectively. However, when polymer-dispersed liquid crystal that micro-particles are in polymer is used as the liquid crystal 155, the above-described alignment film and polarizing plate are not required and thus the light utilization efficiency can increase and the high brightness or the low power consumption can be accomplished.

Also, instead of forming a portion or the whole of a peripheral circuit such as the data line driving circuit 200 or the scanning line driving circuit 100 on the element substrate 151, for example, a driving IC chip mounted on the film may be electrically and mechanically connected to a predetermined location of the element substrate 151 through an anisotropic conductive film by using a TAB (Tape Automated Bonding) technology, and the driving IC chip itself may be electrically and mechanically connected to a predetermined location of the element substrate 151 through the anisotropic conductive film by using a COG (Chip On Glass) technology.

<2: Application Example>

(1) Although the unit control circuit Cj in the circuit block BLi of the data line driving circuit 200 includes the 3-input NOR circuits 511 and 512 and the NAND circuit 521 in order to generate the clock control signal CTLi in the above-described embodiment, 2-input NOR circuit and 4-input NAND circuit may be alternatively used.

Figure 14:
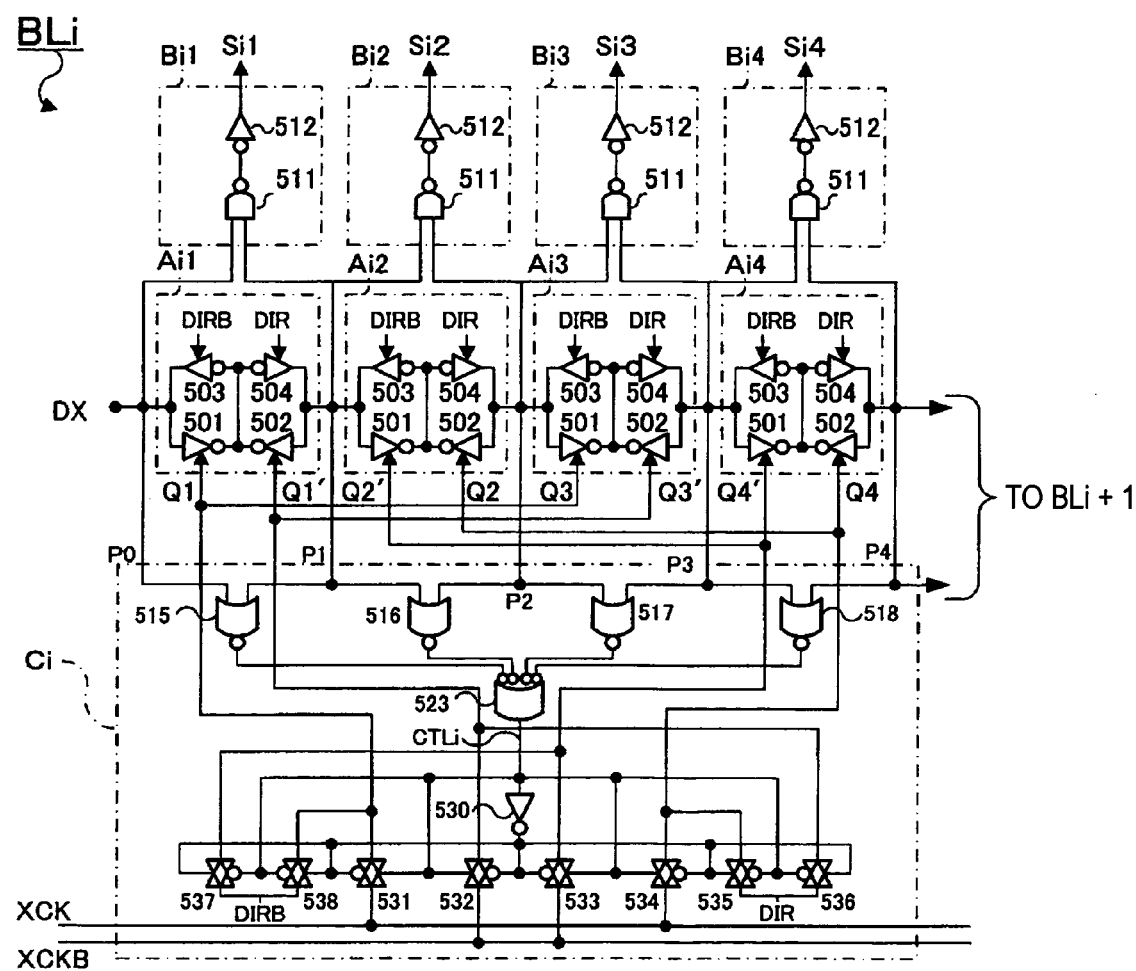
FIG. 14 is a circuit diagram showing another structure of the circuit block BLj.

FIG. 14 is a circuit diagram of the circuit block BLi according to the application example. In this example, 2-input NOR circuits 515 to 518 supplied with the input signals and the output signals of the shift register unit circuits Ai1 to Ai4 are provided. In addition, the output signals of the NOR circuits 515 to 518 are supplied to the 4-input NAND circuit 523. By this structure, when the X transfer start pulse DX is input to the circuit block BLi, the clock control signal CTLi becomes active and the X clock signal XCK and the inverted X clock signal XCKB are supplied to the shift register unit circuits Ai1 to Ai4.

In this case, since one control unit circuit Ci is provided to the plurality of shift register unit circuits Ai1 to Ai4, the circuit structure thereof can be simplified. Also, in the case of being composed of the negative logic, the NOR circuits 515 to 518 are substituted by the NAND circuits and the NAND circuit 523 is substituted by the NOR circuit, thereby reversing the polarities of the control inputs of the transfer gates 531 to 538.

Figure 15:
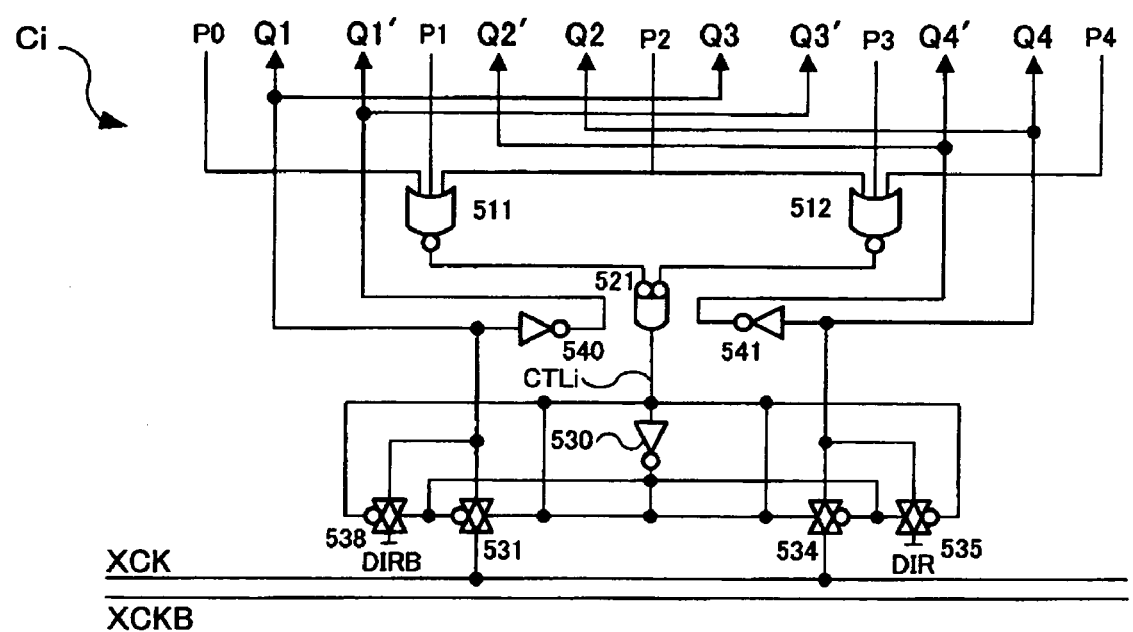
FIG. 15 is a circuit diagram showing another structure of the unit control circuit Ci.

(2) Although the X clock signal XCK and the inverted clock signal XCKB are supplied to the circuit blocks BL1 to BLj in the above-described embodiment, only the X clock signal XCK may be supplied and the inverted X clock signal XCKB may be generated in each of the circuit blocks BL1 to BLj. In this case, the unit control circuit Ci may be constructed as shown in FIG. 15. In this example, since the inverted clock signal XCKB is generated by the inverters 540 and 541, the transfer gates 532, 533, 536, and 537 can be omitted. As a result, the structure of the data line driving circuit 200 can be further simplified.

(3) Although four shift register unit circuits are provided to each of the circuit blocks BL1 to BLj in the above-described embodiment, two or more shift register unit circuits may be provided and thus the number of the circuit clocks may be two or more.

In this case, based on the input signal and the output signal of the shift register unit circuit included in the circuit block, the unit control circuit may specify the operation period of the circuit block and supply the clock signal to the shift register unit circuit in the corresponding period.

In addition, the number of the shift register unit circuits included in the circuit block may be not constant. For example, the circuit block including three shift register unit circuits and the circuit block including four shift register unit circuits may be mixed. Assuming that the number of the shift register unit circuits included in one circuit block is the unit circuit number N, the unit circuit number N is optionally set and thus it can be flexibly coped with even in the case in which the unit circuit number N is not divided by the number of the data line. For example, if the number of the data lines is 362 and the unit circuit number N of the circuit blocks is "4", all the data line cannot be connected to the circuit block. In this case, by using 89 circuit blocks of N=4 and two circuit blocks of N=3, they can correspond to 362 data lines.

Figure 16:
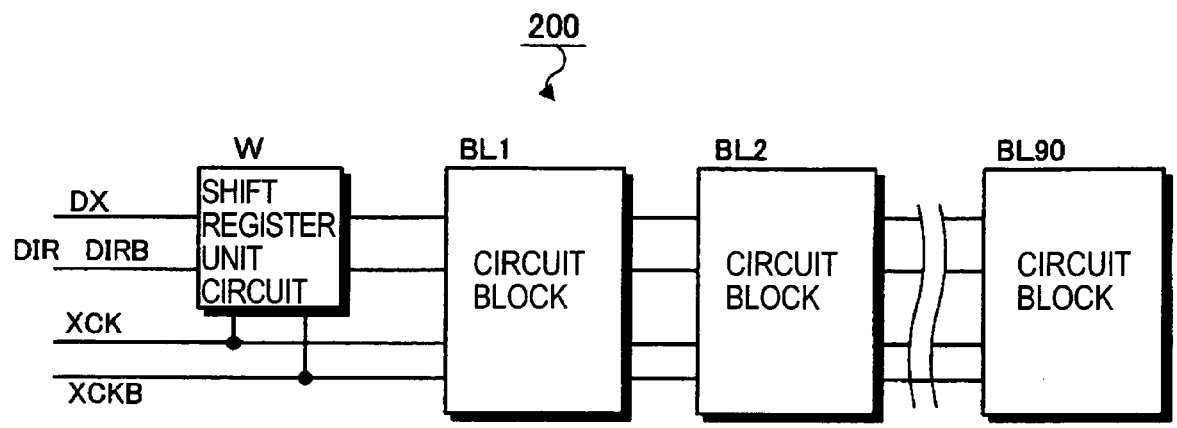
FIG. 16 is a block diagram illustrating another structure of the data line driving circuit.

Further, in the case in which there is a remainder when driving the number of the data lines by the unit circuit number, the shift register unit circuits for directly supplying the X clock signal XCK and the inverted X clock signal XCKB may be provided by the remainder. For example, if the number of the data lines is 361 and the unit circuit number N is 4, the data line driving circuit 200 may be constructed in as shown in FIG. 16. In this case, the shift register unit circuit W is always supplied with the X clock signal XCK and the inverted X clock signal XCKB.

(4) Although the electro-optical device having the liquid crystal is illustrated in the above-described embodiment, the electro-optical device using an electro-optical material other than the liquid crystal can be applied with the present invention. The electro-optical material means the material of which the optical characteristic such as transmittance or brightness is varied by the supply of the electrical signal (the current signal or the voltage signal). For example, various kinds of the electro-optical devices, such as a display panel using an OLED element such as an organic EL (electroluminescent) or light emitting polymer as the electro-optical material, an electrophoresis display panel using a microcapsule including colored liquid and white particles dispersed in the liquid as the electro-optical material, a twisted ball display panel using twisted balls which are coated with different colors for each region of which polarity is different as the electro-optical material, a toner display panel using a black toner as the electro-optical material, or a plasma display panel using a high pressure gas such as helium or neon as the electro-optical material, can be applied with the present invention, similarly to the above-described embodiments.

<3: Electronic Apparatus>

Figure 17:
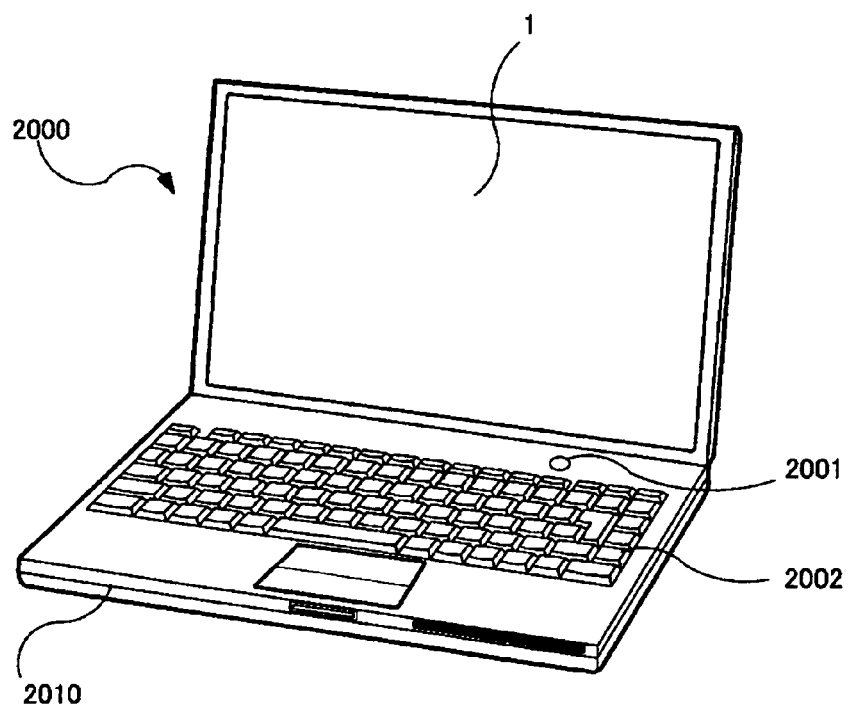
FIG. 17 is a perspective view illustrating the structure of a personal computer which is an example of an electronic apparatus applied with the electro-optical device 1.

Next, an electronic apparatus applied with the electro-optical device 1 according to the above-described embodiment and the application example will be explained. FIG. 17 shows the structure of a mobile personal computer applied with the electro-optical device 1. A personal computer 2000 comprises an electro-optical device 1 functioning as the display unit and a main body 2010. The main body 2010 is provided with a power supply switch 2001 and a keyboard 2002. In this electro-optical device 1, since the structure of the data line driving circuit 200 is simplified, a high definition image can be displayed at a narrow pitch.

Figure 18:
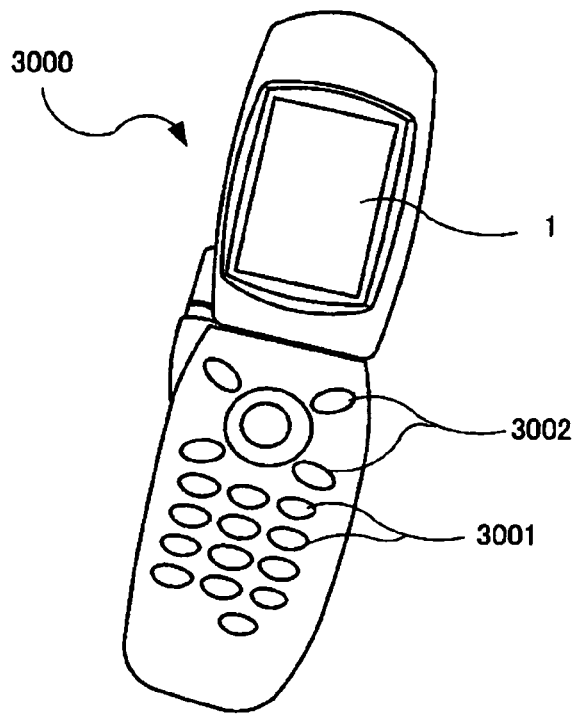
FIG. 18 is a perspective view illustrating the structure a mobile phone which is an example of the electronic apparatus applied with the electro-optical device 1.

FIG. 18 shows the structure of a cellular phone applied with the electro-optical device 1. The cellular phone 3000 comprises a plurality of operation buttons 3001, scroll buttons 3002, and the electro-optical device 1 functioning as the display unit. By operating the scroll buttons 3002, the screen displayed in the electro-optical device 1 is scrolled.

Figure 19:
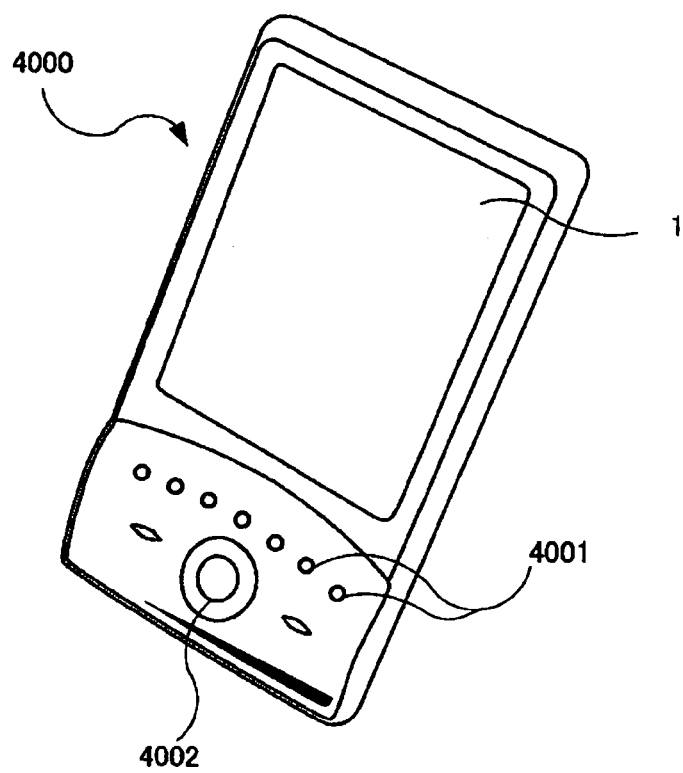
FIG. 19 is a perspective view illustrating the structure of a personal digital assistant which is an example of the electronic apparatus applied with the electro-optical device 1.

FIG. 19 shows the structure of a PDA (Personal Digital Assistant) applied with the electro-optical device 1. The personal digital assistant 4000 comprises a plurality of operation buttons 4001, a power supply switch 4002, and the electro-optical device 1 functioning as the display unit. By operating the power supply switch 4002, various kinds of information such as an address book or a schedule book is displayed in the electro-optical device 1.

As the electronic apparatus applied with the electro-optical device 1, in addition to the electronic apparatuses described above with reference to FIGS. 17 to 19, there are various electronic apparatuses, such as a digital camera, a liquid crystal television, a view-finder-type and monitor-direct-view-type video tape recorder, a car navigation device, a pager, an electronic note, an electronic calculator, a word processor, a work station, a video phone, a POS terminal, and an apparatus with a touch panel. Further, the above-described electro-optical device 1 can be applied to the display units of various kinds of electronic apparatuses.

What is claimed is:

1. A shift register comprising:
a plurality of blocks,
each of the plurality of blocks includes a plurality of shift unit circuits for shifting a input signal in sequence in synchronization with a clock signal and an inverted clock signal thereof and outputting an output signal;
and a unit control circuit that receives all signals output from or input to the plurality of shift unit circuits for specifying an operation period for which any one of the plurality of shift unit circuits is operated and for supplying the clock signal and the inverted clock signal to the plurality of shift unit circuits in the specified period, on the basis of all the signals output from or input to the plurality of shift unit circuits,
the unit control circuit has clock control signal generating means for performing the logical sum operation of the periods for which the input signals and the output signals of the plurality of shift unit circuits become an active state and for generating a clock control signal for specifying the operation period based on the operation results, and supply means for supplying the clock signal and the inverted clock signal to the plurality of shift unit circuits according to the clock control signal,
the start pulse becomes active at the high level,
the clock control signal generating means has a plurality of NOR circuits, and a NAND circuit for performing the inverted logical product operation of the output signals output from the plurality of NOR circuits and outputting it as the clock control signal, and
input terminals of the plurality of NOR circuits are supplied with all the input signals and the output signals of the plurality of shift unit circuits, respectively.

2. The shift register according to claim 1,
wherein the unit control circuit has level fixing means for supplying a low level signal or a high level signal to the plurality of shift unit circuits instead of the clock signal and the inverted clock signal, in a non-operation period other than the operation period.

3. The shift register according to claim 1,
wherein each of the plurality of NOR circuits has three input terminals, and
the NAND circuit has two input terminals which are respectively supplied with the output signals of the NOR circuits adjacent to each other.

4. The shift register according to claim 1,
wherein each of the plurality of NOR circuits has two input terminals and each of the input terminals is supplied with the input signal and the output signal of the shift unit circuit, and
each input terminal of the NAND circuit is supplied with the output signals of the plurality of NOR circuits.

5. The shift register according to claim 1,
wherein the number of the shift unit circuits included in at least one circuit block out of the plurality of circuit blocks is different from the number of the shift unit circuits included in another circuit block.

6. The shift register according to claim 1,
wherein at least one shift unit circuit supplied with the clock signal and the inverted clock signal is provided at the front stage of the input of the plurality of circuit blocks or the rear stage of the output of the plurality of circuit blocks.

7. The shift register according to claim 1,
wherein the shift unit circuit can control the transfer direction of the start pulse based on a transfer direction signal indicating a transfer direction.

8. A data line driving circuit used in an electro-optical device comprising a plurality of scanning lines, a plurality of data lines and a plurality of pixel circuits provided corresponding to intersections of the scanning lines and the data lines, comprising:
the shift register according to claim 1;
a plurality of logical operation circuits for generating data line signals based on the input signals and the output signals of the shift unit circuits; and
a wiring line group for supplying a plurality of data line signals output from the plurality of logical operation circuits to the plurality of data lines, respectively.

9. An electro-optical device comprising:
a plurality of scanning lines;
a plurality of data lines;
a plurality of pixel circuits provided corresponding to intersections of the scanning lines and the data lines; and
the data line driving circuit according to claim 8.

10. An electronic apparatus having the electro-optical device according to claim 9.

11. A scanning line driving circuit used in an electro-optical device comprising a plurality of scanning lines, a plurality of data lines and a plurality of pixel circuits provided corresponding to intersections of the scanning lines and the data lines, comprising:
the shift register according to claim 1;
a plurality of logical operation circuits for generating scanning signals based on the input signals and the output signals of the shift unit circuits; and
a wiring line group for supplying a plurality of scanning signals output from the plurality of logical operation circuits to the plurality of scanning lines, respectively.

12. An electro-optical device comprising:
a plurality of scanning lines;
a plurality of data lines;
a plurality of pixel circuits provided corresponding to intersections of the scanning lines and the data lines; and
the scanning line driving circuit according to claim 11.

13. A shift register comprising:
a plurality of blocks,
each of the plurality of blocks includes a plurality of shift unit circuits for shifting a start pulse in sequence in synchronization with a clock signal and an inverted clock signal thereof and outputting an output signal;
and a unit control circuit for specifying an operation period for which any one of the plurality of shift unit circuits is operated and for supplying the clock signal and the inverted clock signal to the plurality of shift unit circuits in the specified period, on the basis of the input signals and the output signals of the plurality of shift unit circuits, the unit control circuit has clock control signal generating means for performing the logical sum operation of the periods for which the input signals and the output signals of the plurality of shift unit circuits become an active state and for generating a clock control signal for specifying the operation period based on the operation result, and supply means for supplying the clock signal and the inverted clock signal to the plurality of shift unit circuits according to the clock control signal, the start pulse becomes active at the low level, the clock control signal generating means has a plurality of NAND circuits and a NOR circuit for performing the inverted logical sum operation of the output signals output from the plurality of NAND circuits and outputting it as the clock control signal, and the input terminals of the plurality of NAND circuits are supplied with all the input signals and the output signals of the plurality of shift unit circuits, respectively.

14. The shift register according to claim 13, wherein each of the plurality of NAND circuits has three input terminals, and the NOR circuit has two input terminals which are respectively supplied with the output signals of the NAND circuits adjacent to each other.

15. The shift register according to claim 13, wherein each of the plurality of NAND circuits has two input terminals and each of the input terminals is supplied with the input signal and the output signal of the shift unit circuit, and each input terminal of the NOR circuit is supplied with the output signals of the plurality of NAND circuits.

* * * * *